United States Patent [19]

Yusko, Jr. et al.

[11] Patent Number: 4,899,783

[45] Date of Patent: * Feb. 13, 1990

[54] PINCH VALVE

[75] Inventors: Edward M. Yusko, Jr., Denmark; Cal R. Brown, Euclid; Terry M. Kalain, Willoughby; Peter C. Williams, Cleveland Heights, all of Ohio

[73] Assignee: Whitey Co., Highland Hts., Ohio

[*] Notice: The portion of the term of this patent subsequent to Jan. 31, 2006 has been disclaimed.

[21] Appl. No.: 346,066

[22] Filed: May 2, 1989

Related U.S. Application Data

[63] Continuation of Ser. No. 252,257, Sep. 30, 1988, which is a continuation-in-part of Ser. No. 177,971, Apr. 5, 1988, Pat. No. 4,800,920.

[51] Int. Cl.$^4$ ............................ F16K 37/00; F16K 7/07
[52] U.S. Cl. ............................ 137/556; 251/4; 251/5; 251/7
[58] Field of Search ............ 137/556, 559; 251/4, 251/5, 7, 8, 9

[56] References Cited

U.S. PATENT DOCUMENTS

| | | | |
|---|---|---|---|
| 114,981 | 5/1871 | Shoenberger | 251/4 |
| 1,855,323 | 4/1932 | Sirch | 251/8 X |
| 2,112,592 | 3/1938 | MacClatchie | 251/4 |
| 2,197,995 | 4/1940 | Crowley | 251/7 |
| 2,627,874 | 2/1953 | Johnson | 251/5 |
| 2,716,575 | 8/1955 | Vickers | 251/5 X |
| 2,756,959 | 7/1956 | Hill | 251/5 |
| 2,786,608 | 3/1957 | Brown | 251/7 |
| 3,299,904 | 1/1967 | Burke | 251/9 X |
| 3,350,053 | 10/1967 | Schmitz | 251/5 |
| 3,479,001 | 11/1969 | Dower | 251/4 |
| 3,481,610 | 12/1969 | Slator et al. | 251/5 X |
| 3,491,983 | 1/1970 | Van Damme et al. | 251/5 |
| 3,695,576 | 10/1972 | Kane et al. | 251/5 |
| 3,759,483 | 9/1973 | Baxter | 251/5 |
| 3,826,461 | 7/1974 | Summerfield et al. | 251/7 |
| 3,954,251 | 5/1976 | Callahan, Jr. et al. | 251/288 |
| 4,044,990 | 8/1977 | Summerfield | 251/8 |
| 4,303,222 | 12/1981 | Campbell | 251/7 |
| 4,442,954 | 4/1984 | Bergandy | 251/5 X |
| 4,518,145 | 5/1985 | Keltz et al. | 251/5 X |
| 4,523,738 | 6/1985 | Raftis et al. | 251/4 |
| 4,586,873 | 5/1986 | Lepretre et al. | 251/5 X |
| 4,660,802 | 4/1987 | Oscarsson | 251/9 |
| 4,682,755 | 7/1987 | Bernstein et al. | 251/4 |

Primary Examiner—John Rivell
Attorney, Agent, or Firm—Fay, Sharpe, Beall, Fagan, Minnich & McKee

[57] ABSTRACT

An elastomeric sleeve is placed under axial compression in a pinch valve assembly. The axial compression of the sleeve eliminates any crevices with end members that engage opposed end walls of the valve body. Further, axial compression extends cycle life of the valve by maintaining the sleeve in a non-tensile relationship. Mechanical gripping of enlarged flanges defined at opposed ends of the sleeve is also enhanced through axial compression of the sleeve. A positive, visual indication of valve open and closed positions is provided by an indicator stem extending outwardly from an actuator body. In an alternate embodiment, the flanges are reinforced. Additionally, a casting member is interposed between the valve body and sleeve for ease of replacement and maintenance. In still another embodiment, a vent opening in the valve body eliminates pneumatic closure forces on the elastomeric sleeve that can arise when the pinch valve is heated. The vent opening can also be connected to a valve to provide selective venting of the valve body.

15 Claims, 8 Drawing Sheets

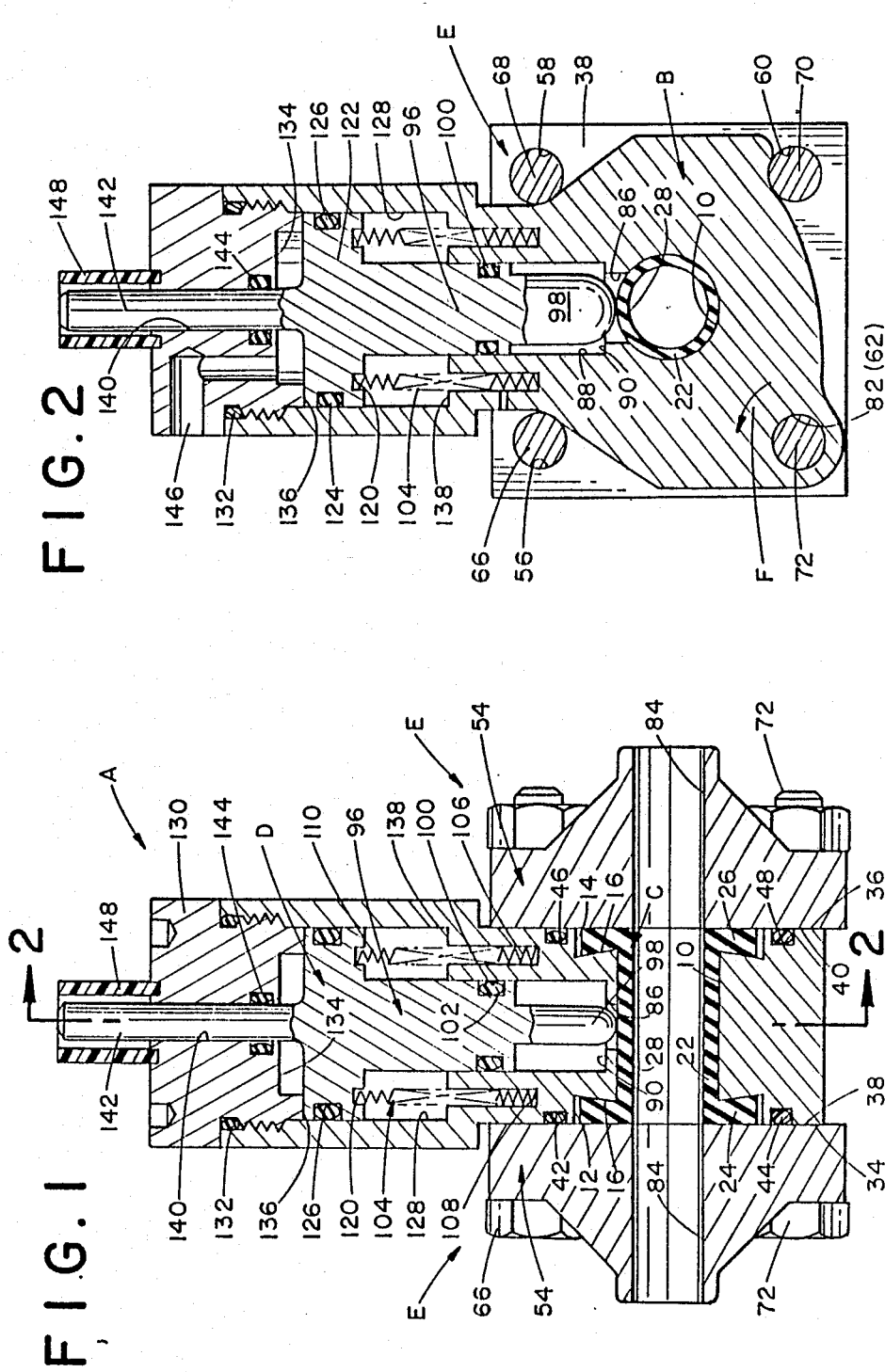

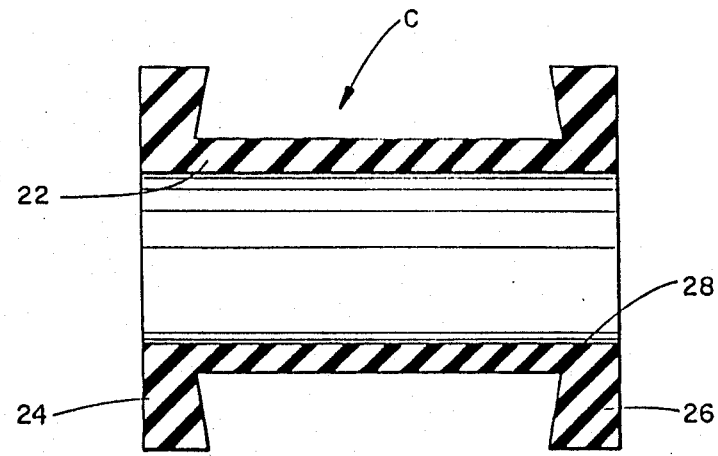
F I G. 3
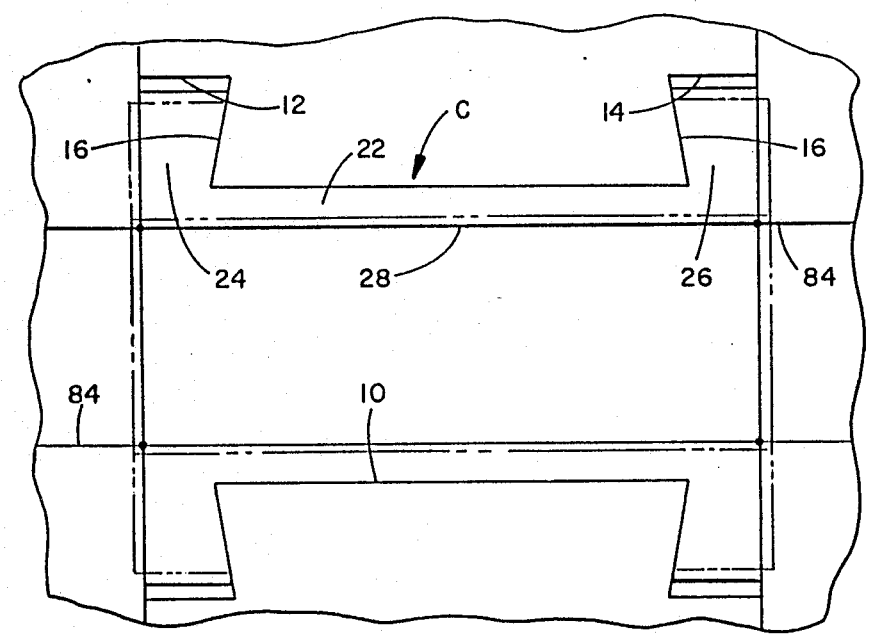
F I G. 4

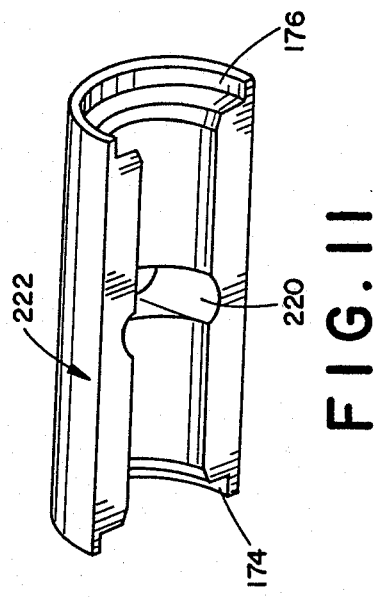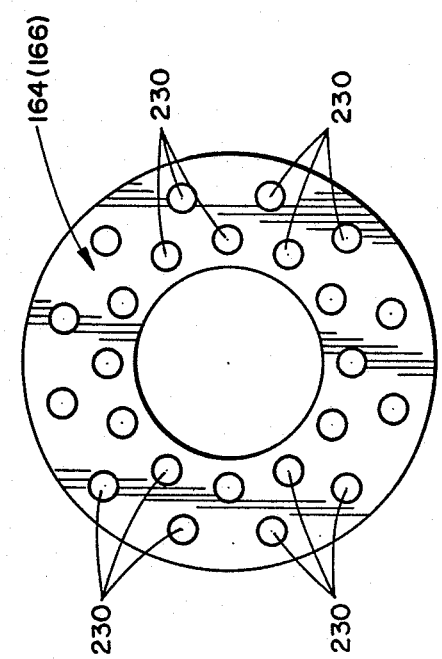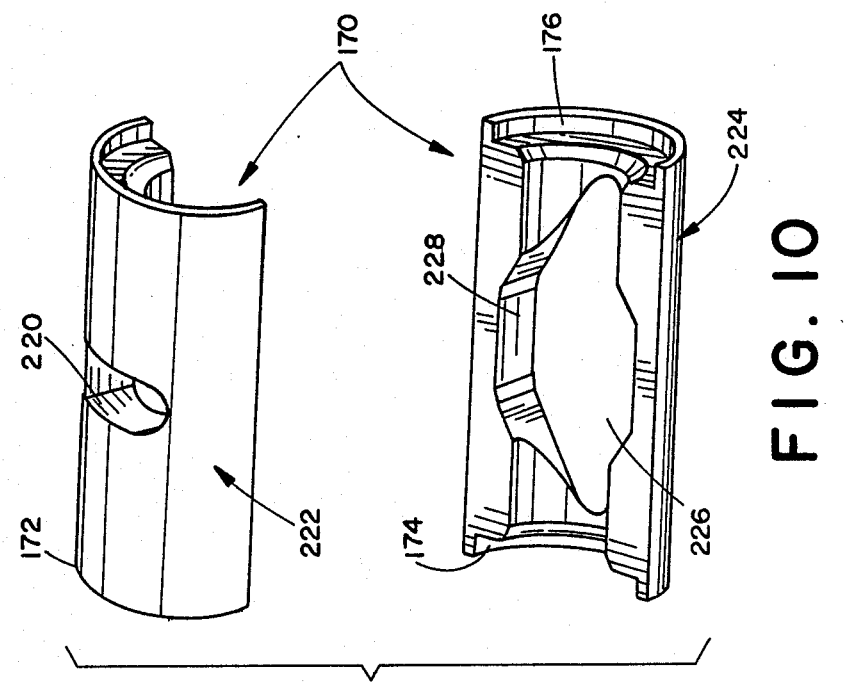

PINCH VALVE

This application is a continuation of Ser. No. 252,257, filed Sept. 30, 1988 which is continuation-in-part of Ser. No. 177,971, filed Apr. 5, 1988, now U.S. Pat. No. 4,800,920.

BACKGROUND OF THE INVENTION

This invention pertains to the art of fluid flow regulation and more particularly to shutoff type flow valves. The invention is particularly applicable to a type of valve known as a pinch valve for use in a biotechnological environment. The pinch valve incorporates a flexible, substantially tubular member that is selectively compressed along an exterior portion to close a central flow passage and will be described with particular reference thereto. However, it will be appreciated that the invention has broader applications and may be advantageously employed in other environments and applications.

Handling of biotechnological components requires an ultra-clean environment and special safeguards to minimize damage to biological material such as elongated chains. Specifically, a smooth, reliable shutoff arrangement is required and dependable drainability of the flow line is necessary to prevent entrapment of the biological material. Only certain types of materials may be utilized in the valve construction due to the potential for interaction with the biological material in the fluid.

Typically, pinch valves incorporate a flexible or elastomeric sleeve that is compressed along an exterior portion to selectively open and close a central fluid passage defined through the sleeve. The life cycle of such a flexible sleeve is dependent on the strength and wear characteristics of the elastomeric material. Particularly, closing the valve places the sleeve under tensile forces which, with repeated flexing or cycling, tends to become stretched and unusable.

For example, U.S. Pat. No. 3,350,053 to Schmitz, issued Oct. 31, 1967, describes some of the problems inherent with pinch valves utilized in the industry. One solution proposed in that patent to the repeated flexing of the elastomeric sleeve is to reduce the diameter to length ratio of the valve body and sleeve to as low a value as possible. It is believed that this ratio reduction provides a compact structure that limits the stretching of the resilient material of the sleeve.

Another avenue of attack for increasing the cycle life of the sleeve is to limit forces tending to pull end flanges of the sleeve toward the center of the valve. The solution offered by the Schmitz patent to this problem is to employ a preselected bulge molded into the sleeve between the end flanges. In this manner, the sleeve is positioned in an unstretched, slack arrangement and a valve actuating member has a predetermined range of movement that takes up the slack molded into the sleeve. Thus, the sleeve experiences reduced, if any, tensile forces as a result of actuator movement to a closed position. Although suitable for some fluid applications, it is considered desirable to eliminate the bulge molded into the sleeve in other applications because of the potential entrapment of biological material and variation in the flow passage configuration that disrupts the pursuit of laminar flow conditions.

Yet another problem associated with remotely operated valves of this type is the lack of any indication of the valve open and closed positions. It is critical to readily determine whether or not fluid flow is shut off so that downstream operations for repair, servicing, and the like may be conducted. Prior pinch valve structures have failed to adequately address this situation.

Still another area of concern is the drainability of the valve that may be effected through the type of actuation mechanism or repeated flexing of the valve sleeve. Although the elastomeric materials utilized in the makeup of the valve sleeve have resilient properties, continued flexing or cycling results in stretching or permanent deformation of the valve sleeve. If the sleeve is closed through the application of peripheral forces along a bottom portion of the sleeve as is common in prior pinch valve structures, stretching or deformation may result. This, in turn, inhibits drainability of the valve after the valve has been in use for an extended period of time since fluid upstream of the actuating area of the sleeve will not freely drain along the bottom portion.

As indicated above, some pinch valve arrangements utilize end flanges in an effort to grip the valve sleeve in the body. The use of flanges has met with substantial commercial success but the sleeve configuration has provided some difficulty in maintenance and replacement situations.

The necessity for an ultra-clean environment requires that components handling biological materials be frequently and thoroughly cleaned. For example, prior valves have been autoclaved, i.e., subject to sterilizing action using superheated steam under pressure. The entire valve body is heated during the sterilizing process, which heating can have adverse effects on the operation of the valve.

The subject invention contemplates a new and improved pinch valve arrangement that overcomes all of the above referenced problems and others and provides an easily assembled, reliable valve structure.

SUMMARY OF THE INVENTION

According to the present invention, there is provided an improved pinch valve arrangement particularly adapted for biotechnological environments.

According to a more limited aspect of the invention, the valve includes a rigid body having an opening for receiving a flexible sleeve therein. The flexible sleeve has an unstressed, predetermined axial dimension greater than a stressed, second axial dimension. First and second end members are received on either end of the body for retaining the sleeve against axial movement. The end members place the sleeve under compression thereby reducing the axial dimension of the sleeve.

According to another aspect of the invention, a casing member is closely received in the valve body and closely receives the flexible sleeve therein to aid in maintenance and replacement of the sleeve.

According to yet another aspect of the invention, the sleeve includes reinforcing rings secured at opposite ends.

According to a further aspect of the invention, means for minimizing torque transmission to an actuating plunger is provided.

According to a still further aspect of the invention, means for venting the valve body may be included.

According to another aspect of the invention, the casing member is configured to accommodate lateral expansion of the flexible sleeve during closure.

According to still another aspect of the invention, the reinforcing rings include plural openings to aid in elastomer flow during manufacture of the reinforced sleeve.

A principal advantage of the invention resides in the improved operation of the valve sleeve.

Yet another advantage is found in the ultra-clean valve that results from this structure.

Still another advantage is realized in the ease of replacing or maintaining the valve sleeve.

Still other advantages result from selective venting of the valve body.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG 1 is a vertical, longitudinal cross-sectional view of a pinch valve constructed in accordance with the subject invention;

FIG. 2 is a view generally along the lines 2—2 of FIG. 1;

FIG. 3 is a cross-sectional view of the valve sleeve according to the subject invention;

FIG. 4 is an enlarged, cross-sectional view illustrating the stressed and unstressed states of the elastomeric sleeve and cooperation with the valve body;

FIG. 10 is an exploded perspective view of a modified casing member;

FIG. 11 is a perspective view of the underside of one of the casing member components illustrated in FIG. 10;

DETAILED DESCRIPTION OF THE PREFERRED EMBODIMENTS

Figure 5:
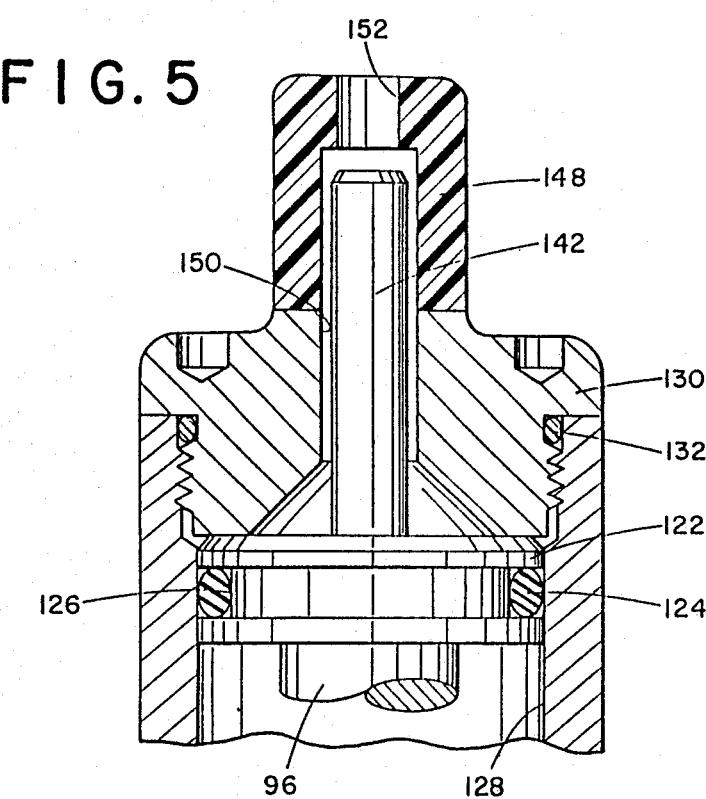
FIG. 5 is a modified arrangement of a fluid operated actuator.

Referring now to the drawings wherein the showings are for purposes of illustrating the preferred embodiments of the invention only and not for purposes of limiting same, the FIGURES show a pinch valve A having a central valve body B, a flexible elastomeric sleeve c, actuating mechanism D, and opposed valve body end members E.

More particularly and with reference to the embodiments of FIGS. 1-6, the valve body is of rigid construction, preferably stainless steel. A first axial bore 10 extends through the body for receipt of the elastomeric sleeve. First and second counterbores 12, 14 are disposed at opposite ends of the bore for reasons which will become more apparent hereinbelow. Each counterbore defines a generally radially extending shoulder 16 with the bore. The shoulders 16 are configured to extend axially inward as they extend radially outward from the bore to the respective counterbore sidewall.

The sleeve C includes a generally cylindrical central portion 22 having an outer peripheral dimension closely received in the bore 10. Enlarged radially extending flanges 24, 26 are defined at opposite ends of the sleeve. The flanges increase in axial dimension as they extend radially outward from a central opening 28 of the sleeve. That is, the configuration of the flanges approximates the configurations of counterbores 12, 14 in which they are respectively received.

The end members E are received on opposite ends of the central valve body B to matingly engage first and second end walls 34, 36 of the valve body. Specifically, generally planar walls 38, 40 abuttingly engage the end walls 34, 36, respectively. A first groove 42 is defined in the end wall 34 to receive seal member 44 and, likewise, second groove 46 is defined in end wall 36 to receive a seal member such as O-ring 48. The seal members provide a back-up seal arrangement between the central valve body and end members as will become more apparent below. Since the end members are of identical construction, description of one end member will be equally applicable to the other end member unless noted otherwise.

An enlarged portion 54 of end member E is disposed adjacent the valve body and includes four generally equally spaced openings 56, 58, 60, 62 adapted to receive fastening means such as nut and bolt type fasteners 66, 68, 70, 72. The fasteners extend freely through the enlarged portions of the end members and three of them, namely, 66, 68, 70 are disposed along peripheral portions of the valve body B (FIG. 2). The fourth fastener 72 extends through a lobe portion 80 of the central valve body. The lobe portion includes an axially extending opening 82 that is concentric with openings 62 of the end members when the valve is assembled.

As detailed in commonly assigned U.S. Pat. No. 3,954,251 to Callahan, Jr., et al., issued May 4, 1976, this valve body and fastener arrangement provides a swing-out feature of the central valve body relative to the valve body end members by removal of a single fastener. Particularly, removal of fastener 66 permits the valve body to rotate around fastener 72 in a counter-clockwise manner as illustrated by arrow F. This structural arrangement facilitates ease of replacement of the seal members 44, 48 or provides access to the elastomeric sleeve C if replacement or maintenance is necessary. Throughout the change-over process, the central valve body is held in axial position relative to the end members such that proper realignment is achieved merely by rotating the central body back into its original position shown in FIG. 2. Since details are described in the noted patent and form no part of the subject invention, further discussion herein is deemed unnecessary.

The end members also include through passages 84 that define either an inlet or an outlet to the central valve body. Suitable connections between the through passages and an associated fluid system can be made through well known pipe or fluid connection means as conventionally used in the art. When the valve is assembled, the passages 84 and sleeve openings 28 define a straight flow-through passage of substantially constant diameter that limits potential shearing of the biological material in the fluid and promotes laminar flow.

Figure 6A:
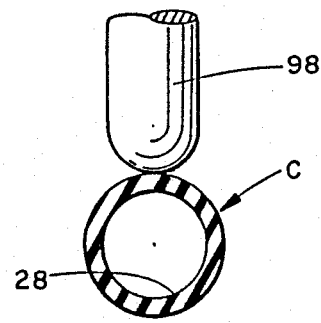
FIG. 6A is a representation of the valve sleeve and actuating member in a valve open position.
Figure 6B:
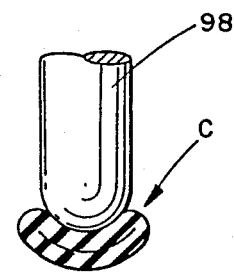
FIG. 6B is a representation of the actuating member and sleeve in a valve closed position.

As illustrated in FIGS. 1 and 2, a bore 86 extends through the central valve body and generally perpendicular to bore 10. Counterbore 88 extends coaxially from bore 86 defining a radial shoulder 90 therewith. The actuating mechanism D includes a closure member 96 having a reduced diameter tip 98 dimensioned for close receipt through bore 86. The tip 98 preferably has a rounded end for engagement with cylindrical portion 22 of the sleeve as will be described in greater detail below. The tip can have a blade-like configuration as apparent in FIGS. 1 and 2 or a cylindrical configuration as illustrated in FIGS. 6A and 6B. Of course, still other tip configurations having a rounded end can be used without departing from the scope and intent of the subject invention.

A seal member such as O-ring 100 is received in a peripheral groove 102 on the closure member to seal between the closure member and counterbore 88. According to the preferred embodiment, the closure member cooperates with a biasing means such as spring 104. The spring has a first or lower end 106 received in an annular recess 108. The second or upper end 110 of the spring is received in an annular groove 120 of closure member piston 122. Receipt of opposite ends of the spring in the recess and groove maintains alignment of the closure member in counterbore 88 and normally biases the closure member outward to a valve open position. A seal member such as O-ring 124 is received in a peripheral groove 126 of the piston to sealingly engage a second enlarged counterbore 128. A closure cap 130 is threadedly received in an upper end of the valve body and is sealingly engaged therewith by means of yet another seal member such as O-ring 132.

Additionally, an inner end of the closure cap has a reduced diameter recess 134 that extends outwardly from a stop shoulder 136 that limits outward biasing movement of the piston and closure member. Shoulder 138 defined between counterbores 88, 128 defines a stop surface that limits inward movement of the piston.

An opening 140 is defined in the recess 134 and receives a stem 142 therethrough extending outwardly from an upper face of the piston. In the embodiment of FIGS. 1 and 2, the stem is slidably and sealingly received through the opening by means of seal member 144. Thus, an inlet 146 is also formed in the closure cap to permit fluid such as air under pressure to selectively enter recess 134 and overcome the bias of spring 104 thereby advancing the piston and closure member toward the elastomeric sleeve. The tip 98 is advanced against the cylindrical portion of the sleeve and "pinches" the sleeve to a closed position (FIG. 6B). Removal of the air pressure from inlet 146 permits the spring 104 to bias the piston and closure member back to a normally open position, thus restoring the tip and sleeve to the FIG. 6A position.

A transparent shroud 148 extends outwardly from the closure cap and receives the outer end of the stem 142. In a valve open position, the stem is clearly visible through the shroud. On the other hand, in the valve closed position, the closure member has moved downwardly to pinch the elastomeric valve sleeve so that the stem cannot be seen through the shroud. This provides a positive visual indication of the valve open and closed positions.

According to the modified actuator embodiment of FIG. 5, the inlet 146 is removed from the closure cap and opening 140 is enlarged to define an annular inlet passage 150. The shroud 148 includes an opening 152 at its outer end for communication with an external fluid supply (not shown) to permit fluid flow to the upper face of the piston. This arrangement provides for a dual use of the shroud 148 as both a valve open/closed indicator and the inlet for the remote actuator system. Still further, the modified actuator arrangement eliminates the use of one sliding seal member, notably seal member 144. In all other respects, the modified valve structure of FIG. 5 operates as disclosed with respect to the previous embodiment.

When used in ultra-clean environments such as the biotechnological applications discussed above, it is critical that all crevices in the fluid flow passage be eliminated to minimize the chance for entrapment of particles. To accomplish this objective in the present application, and with particular reference to FIG. 4, the unstressed configuration of the elastomeric sleeve is illustrated in phantom while the final, assembled configuration is shown in solid lines. As is apparent, the axial dimension of the unstressed sleeve is somewhat greater than that of the central valve body. When the end members are brought into an assembled, sealing engagement with the valve body, the sleeve is axially compressed which results in a number of benefits. Particularly, the cross-sectional dimension of the sleeve opening 28 is reduced to closely approximate that of openings 84 in the end members. Stated another way, axial compression of the sleeve provides a radial expansion of the sleeve to eliminate any crevices between the body and end members. An unobstructed, straight flow-through passage is thus defined by the assembled valve.

Axial compression of the sleeve also provides a primary seal between the end members and valve body. Thus, seal members 44, 48 are secondary seals that guard against fluid loss should the elastic element rupture. They are not the primary seals. The radial outward expansion of the flanges also promotes a secure mechanical engagement between the sleeve and valve body along the shoulders 16 of the first and second counterbores 12, 14. This prevents pullout of the flanges resulting from forces imposed by the closure member advancing and retracting between open and closed positions.

Yet another advantage is realized by the compression of the valve sleeve. Prior arrangements molded a predetermined bulge into the central portion of the sleeve to accommodate the tensile forces on the sleeve by the pinch arrangement. By axially compressing the sleeve in the present application and placing the sleeve in a compressive state, tensile forces do not arise in the sleeve until a point much later in the closing stroke of the closure member 96. That is, the initial portion of the closing stroke transforms the sleeve from a compressive state to a neutral or non-compressive state. Further pinching of the valve sleeve during the closing stroke results in tensile forces in the valve sleeve but these tensile forces are not encountered until much later in the closing stroke then previous structures. Thus, the overall valve design has a higher cycle life rating due to the lower tensile forces. Concurrently the pullout forces imposed on the flanges are reduced.

As is also apparent, the valve sleeve is only pinched from the upper side by the actuating mechanism as opposed to pinching from diametrically opposite sides of the sleeve. This is important from the aspect that the lower side of the valve sleeve as shown in FIGS. 1 and 2 never undergoes any cycling or deformation. In the biotechnological field it is imperative that the flow passage not be obstructed or form any traps for the fluid. By not actuating the lower portion of the valve sleeve drainability is enhanced.

Figure 7:
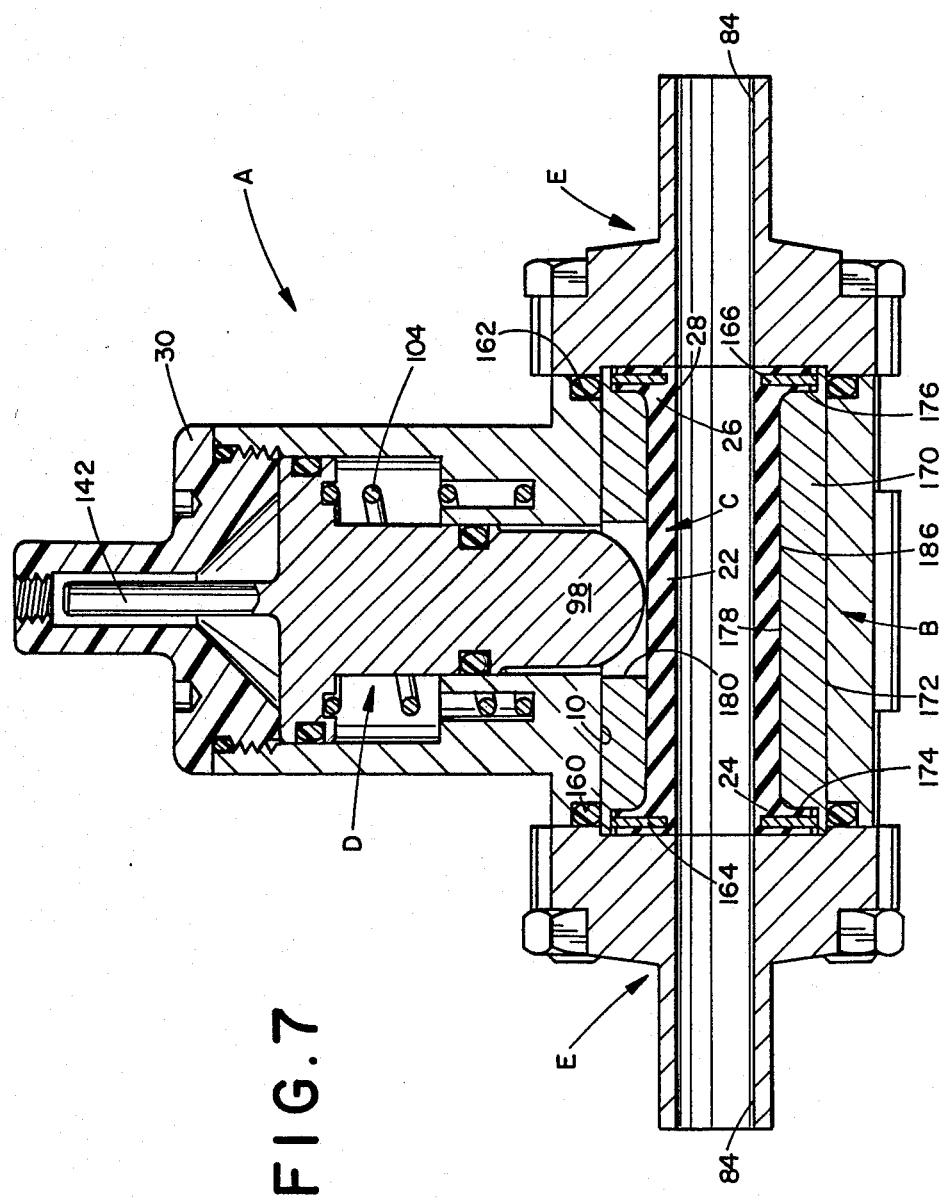
FIG. 7 is a longitudinal cross-sectional view of a modified pinch valve structure.
Figure 8:
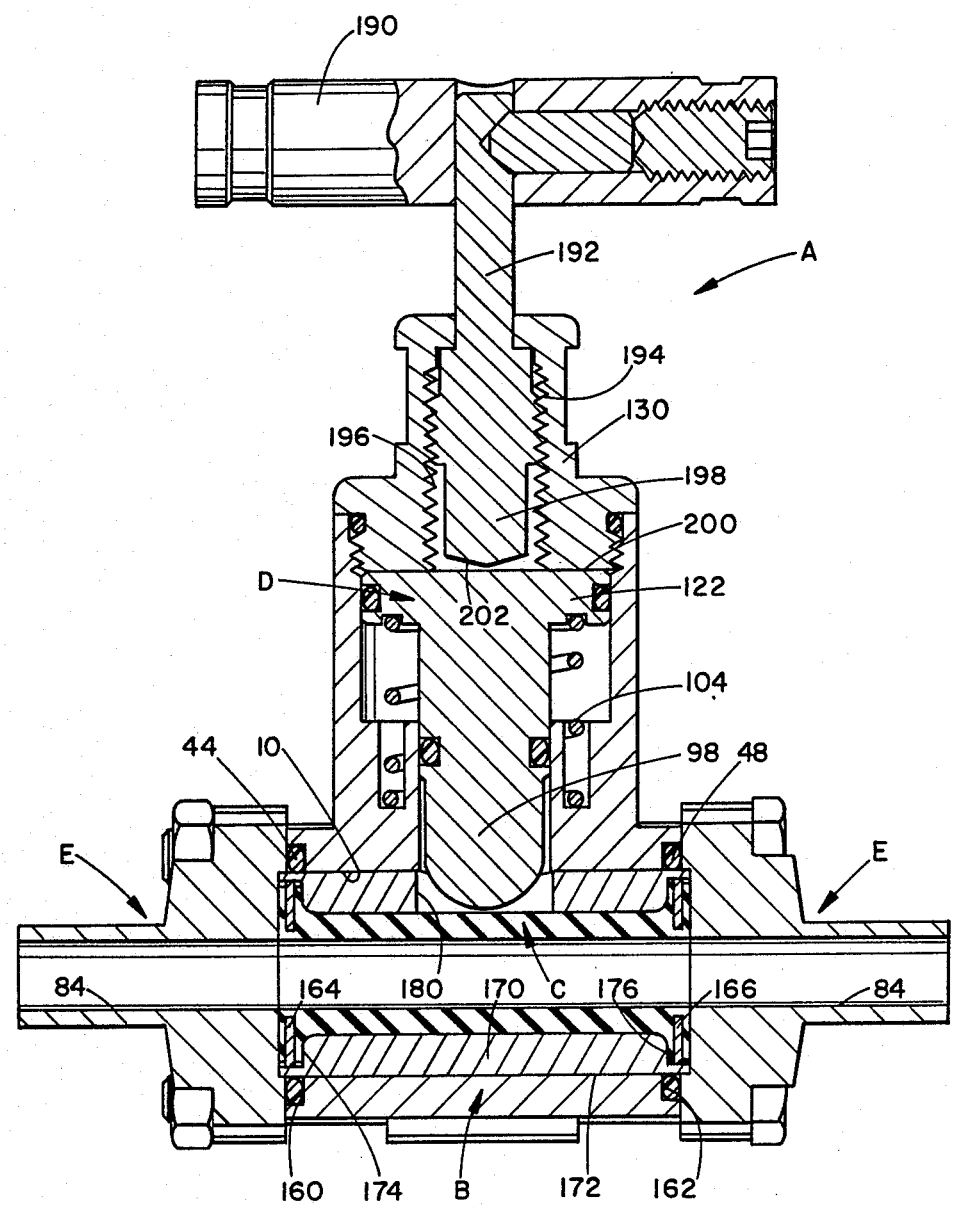
FIG. 8 is a longitudinal cross-sectional view of a manually actuated arrangement of the modified pinch valve structure of FIG. 7.

FIGS. 7 and 8 illustrate a further modification to the general valve construction described above. For ease of discussion and illustration, like numerals will identify like components while new numerals will be used to identify new elements. The major modification resides in the valve sleeve C and its receipt in the axial bore 10 of the valve body. More specifically, the bore 10 is of generally constant dimension and communicates with counterbores 160, 162 at opposite ends. The counterbores receive seal members 44, 48 that provide the same back-up seal arrangement between the central valve body and the end members as described above with respect to the O-rings 44, 48 in the FIG. 1 embodiment. Rather than providing separate grooves in an area radially spaced from the bore 10, the modified structure permits the counterbores 160, 162 to receive the seal members and advantageously function in the same manner.

The valve sleeve includes enlarged radially extending flanges 24, 26 defined on opposite ends of cylindrical central portion 22. According to this embodiment, though, the flanges maintain a generally constant axial dimension as they extend radially outward from central opening 28 of the sleeve. To provide the same secure mechanical engagement between the sleeve and valve body, rigid metal rings 164, 166 are defined in the sleeve flanges. More particularly, the rings are bonded through a suitable process to the elastomeric material of the valve sleeve. The rings serve a plurality of purposes. Primarily, the rings assure a close dimensional fit between the compressed valve sleeve and the end members E. Stated in another manner, in the assembled valve the cross-sectional dimension of the sleeve opening 28 closely approximates that of openings 84 in the end members and the ring members assure that a close tolerance is achieved therebetween.

Secondly, the metal rings serve the purpose of providing sufficient rigidity to the flanges so that the axial compression imposed on the sleeve by the end members forms a primary sealing surface between the sleeve and end members.

Due to the difficulty in repairing and replacing valve sleeves in a body configuration such as shown in the FIG. 1 embodiment, the sleeve is modified to include a second component comprising a casing member 170. The casing member is generally cylindrical and has an outer peripheral dimension 172 closely received in the axial bore 10 of the valve body. Smoothly contoured recesses 174, 176 are defined at opposite ends of the casing member and merge into a generally constant diameter opening 178 that closely receives the central portion 22 of the valve sleeve. Preferably, the casing member is formed of a material more rigid than that of the flexible valve sleeve. By way of example only, some preferred materials of construction include plastic or metal. This provides a sufficient backup surface for the sleeve as it is compressed axially during assembly of the valve. The casing member also includes a sidewall opening 180 that receives the rounded end 98 of the closure member.

The two-part cartridge arrangement defined by the valve sleeve and casing member 170 facilitates ease of replacement and maintenance of the pinch valve. The generally constant dimensioned outer periphery 172 of the casing member permits the cartridge arrangement to be axially slid within the bore 10. The entire cartridge arrangement can be replaced as a unit and eliminates any on-site manipulation of the enlarged radial flanges of the valve sleeve as encountered with an arrangement according to the FIG. 1 embodiment.

According to a still further modification, the outer diameter of the valve sleeve may be provided with a support layer such as fabric reinforcement 186. This maintains some body or form to the flexible valve sleeve and provides a smooth transition surface between the flexible nature of the elastomeric sleeve and the more rigid construction of the casing member 170.

The entire closure cap 30 in the FIG. 7 embodiment is formed from a transparent plastic material to aid in monitoring the stem 142 of the actuating mechanism. This, of course, provides a positive indication of the valve open or closed position as described above.

In the manually actuated valve arrangement of FIG. 8, rotation of handle 190 advances and retracts actuating stem 192 relative to the closure cap 130. The means for advancing and retracting the actuating stem results from the well-known use of an external threaded region 194 on the stem and internally threaded opening 196 in the closure cap. A lower end 198 of the actuating stem selectively engages an upper surface 200 of the piston 122 to advance the rounded end of the closure member to a closed, pinched arrangement of the valve sleeve. In the pneumatic actuated version illustrated in FIG. 7, the actuating mechanism D is axially reciprocated in response to the selective application of fluid pressure to the upper surface of the piston. Spring 104 returns the piston and actuating mechanism to a normally open position. In order to increase valve life, and particularly the cycle life of the flexible sleeve, in the manually actuated valve it is necessary to minimize the transmission of torque between the selectively rotatable actuating stem and the sleeve. Means for minimizing the torque transmission is provided by the stem gimbal 202 defined on the lower end of the stem. The gimbal is a generally conical surface that provides point contact with the closure member 96. Thus, axial advancement of the closure member is effected though the point contact without the transfer of rotary motion from the actuating stem to the closure member.

Figure 9:
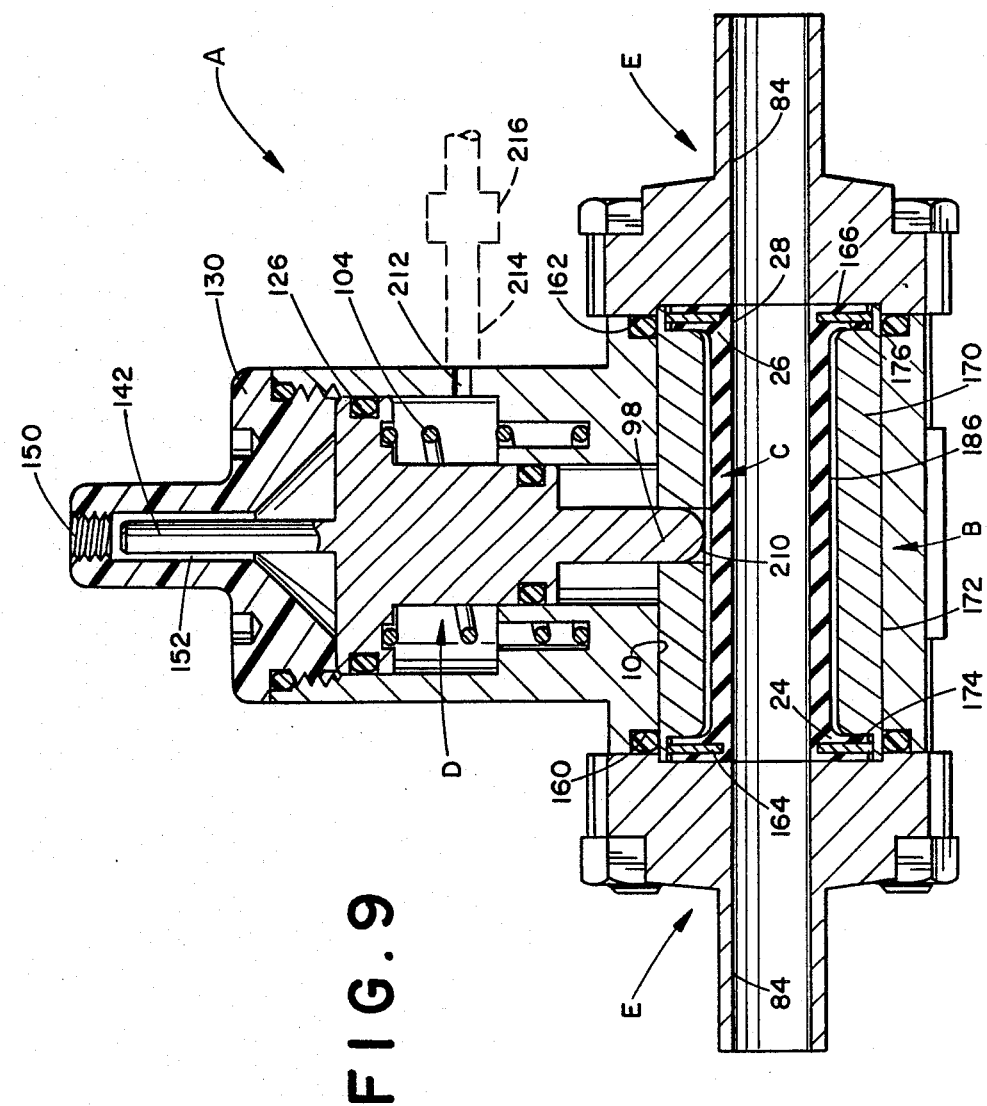
FIG. 9 is a longitudinal cross-sectional view of another modified pinch valve structure.
Figure 13:
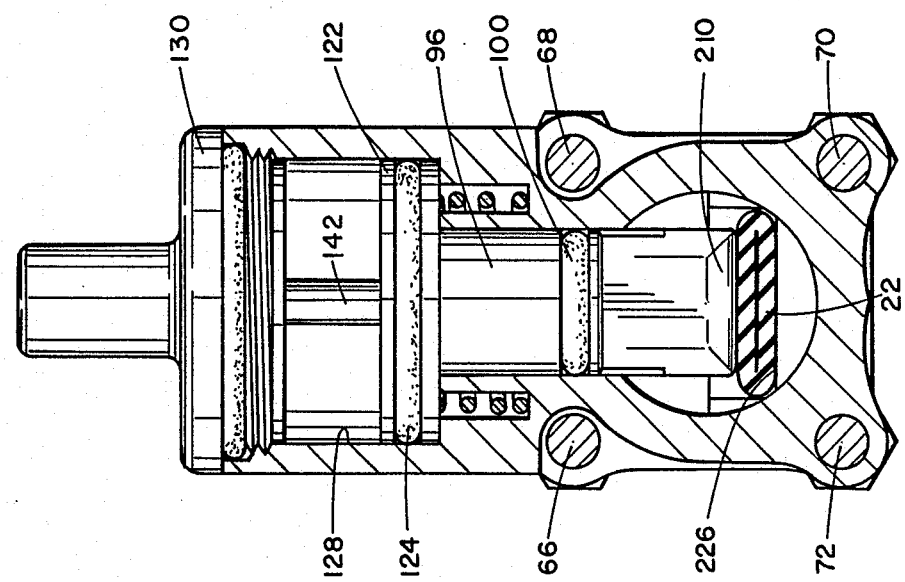
FIG. 13 is a view similar to FIG. 12 but illustrating the valve in a closed position; and, FIG. 14 is a plan view of a modified reinforcing ring for incorporation into a pinch valve sleeve.
Figure 12:
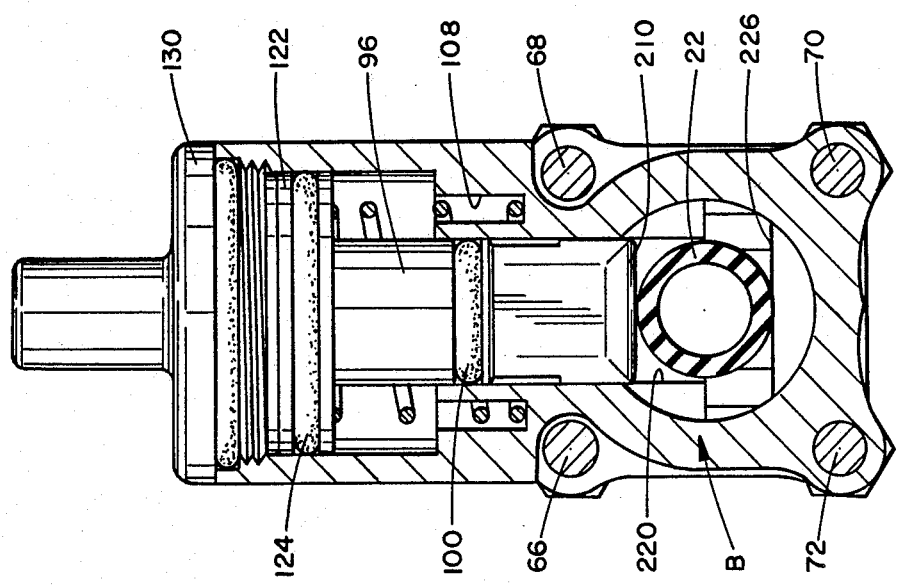
FIG. 12 is a view of a pinch valve in an open position incorporating the modified casing member of FIGS. 10 and 11.

Turning now to FIG. 9, the pinch valve shown there is structurally similar to the modified embodiment of FIG. 7. Therefore, and for ease of illustration, like elements are identified by like numerals and new elements are identified by new numerals. The closure member 96 also includes a reduced diameter tip having a rounded end. Unlike the blade configuration of FIGS. 1 and 2 or the cylindrical configuration of FIGS. 6A and 6B, the rounded tip defines a generally horizontal, semi-cylindrical surface 210. Further reference to FIGS. 12 and 13 assist in visualization of the configuration of surface 210. This modified tip distributes the closing forces over a larger surface of the flexible sleeve sidewall. As will be apparent to those skilled in the art, this structural arrangement provides effective valve closure and increases the useful life of the flexible sleeve.

Another modification of the FIG. 9 embodiment is directed to a means for venting the valve body. Specifically, the venting means is defined by a vent or weep opening 212 and the elimination of seal member 100 from the reduced diameter tip of the closure member. This combination vents the valve body, particularly the normally sealed area defined by opening 86 and counterbore 88 around the flexible sleeve. The venting means permits the area outside the flexible elastomer sleeve to openly communicate or breathe with the ambient environment.

Incorporation of the venting means eliminates pneumatic closure forces that arise during valve cleaning. Typically, the pinch valve is autoclaved, i.e., subject to a sterilizing process that uses superheated steam under pressure. The entire valve body is subject to a temperature increase during the autoclaving process. In the embodiments illustrated in FIGS. 1-8, the area outside the flexible sleeve is sealed from ambient air. Thus, pressure in the closed area rises as the temperature rises and the pressure imposes a pneumatic closure force on the flexible sleeve. The described venting means eliminates this undesirable action.

Another advantage resulting from the venting means is that if the flexible sleeve fails, leakage through the vent opening is readily detected. As illustrated in phantom in FIG. 9, a sight pipe or tube 214 may be connected to the vent opening. The sight pipe aids in detection and to minimize spillage if a leak occurs. When processing expensive biological batches, minimizing a spill can have a major economic effect and/or permit salvaging the remainder of a batch before contamination develops.

Of course it is understood that some biological fluids cannot be leaked into the environment under any circumstances. With such constraints, it is still desirable to eliminate pneumatic closure forces. One proposed solution is to provide selective venting of the area outside the flexible sleeve. Accordingly, a valve schematically represented at 216 may be secured to the sight pipe for selective communication between the valve body interior and ambient air. By way of example, selective operation of the venting means, particularly valve 216, provides an open path during temperature excursions such as steam-in-place autoclaving and a closed path during biological batch processing.

Referring again to FIG. 9, and with additional reference to FIGS. 10-13, the horizontal semi-cylindrical tip 210 will be described in greater detail. To accommodate this tip configuration, the casing member 170 is modified. The sidewall opening adopts a generally elongated or elliptical conformation 220 to freely receive the tip 210 therethrough. A first or upper component 222 of the two-part casing member maintains the smoothly contoured outer periphery 172 that is adapted for close receipt in the bore 10. Likewise, the interior conformation remains substantially the same for closely receiving the flexible sleeve.

On the other hand, the interior conformation of a second or lower component 224 of the casing member is altered to accommodate the "pinched" or closed valve sleeve. Preferably a planar area 226 extends longitudinally and transversely along the interior surface of the lower component 224. The planar area provides sufficient area into which the pinched sleeve may expand. Extending the planar area longitudinally along substantially the entire casing member, that is from end to end, prohibits formation of a dip or weir in the flexible sleeve that would impair fluid drainability through the valve. The extent of the planar area in a lateral dimension decreases as it extends longitudinally from a generally constant dimension central region 228. Again, this facilitates receipt of the pinched sleeve in the lower component 224 without constricting the flow channel. Stated in another manner, the pinching action of the tip 210 is not constrained by abrupt contours in the lower component of the casing member. The flexible sleeve deforms as a result of the pinch action of the tip 210 and not from abrupt changes in the interior conformation of the lower component.

Lastly, the reinforcing or rigid rings 164, 166 may be modified as illustrated in FIG. 14. A series of apertures 230 are disposed in a predetermined pattern and extend completely through the rings. The apertures permit elastomer flow during molding manufacture of the reinforced flexible sleeves. The apertures, in turn, aid in bonding between the rings and flexible sleeve to provide integral, reinforced end flanges 24, 26.

The invention has been described with reference to the preferred embodiments. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A valve comprising:
    a body having an opening for communicating with an inlet defined in a first end member and an outlet defined in a second end member, said end members being disposed on opposite sides of said body;
    a flexible member closely received in said opening, said flexible member having first and second ends abuttingly engaging said first and second end members and a bore extending through said flexible member communicating with said inlet and outlet, said flexible member having an unstressed, first axial dimension greater than a compressed, second axial dimension;
    means for interconnecting said first and second end members and axially compressing said flexible member to said second axial dimension; and,
    an actuation member associated with said body for selective reciprocation toward and away from said flexible member to affect opening and closing of said valve.

2. The valve as defined in claim 1 wherein said body includes a pinch opening disposed generally perpendicular to said body opening, said body further including an actuating chamber having a guide portion extending coaxially from said pinch opening, said guide portion dimensioned to receive a pinch member stem for maintaining linear movement of said actuation member.

3. The valve as defined in claim 2 further comprising a seal member interposed between said pinch member stem and guide portion.

4. The valve as defined in claim 1 wherein said actuation member has a smooth, rounded end for engaging said flexible member.

5. The valve as defined in claim 4 wherein said actuation member includes a piston integrally formed thereon at a location remote from said rounded end, said piston being closely received in an actuating chamber.

6. The valve as defined in claim 4 wherein said actuation member includes an indicating stem at an end opposite from said rounded end, said indicating stem extending outwardly from said body in a valve open position.

7. The valve as defined in claim 6 further comprising means for biasing said actuation member towards the valve open position.

8. The valve as defined in claim 1 wherein said flexible member has first and second enlarged flanges at said first and second ends, respectively, said flanges having tapered configurations that increase in axial dimension as said flanges extend radially outward.

9. The valve as defined in claim 1 wherein said actuation member has a cylindrical configuration with a rounded, spherical end.

10. The valve as defined in claim 1 wherein said actuation member has a blade configuration with a smooth, rounded end.

11. The valve as defined in claim 1 wherein said actuation member has a generally semi-cylindrical end.

12. The valve as defined in claim 1 further comprising means for venting said body at an area encompassing said flexible member.

13. The valve as defined in claim 12 wherein said venting means includes a valve for selectively venting said body.

14. The valve as defined in claim 1 wherein said flexible member has first and second enlarged flanges at said first and second ends, respectively, said flanges each including a rigid ring disposed therein.

15. The valve as defined in claim 14 wherein said rigid rings include plural apertures therethrough facilitating connection to said flanges.

* * * * *